United States Patent
Farine et al.

(10) Patent No.: US 6,650,150 B2
(45) Date of Patent: Nov. 18, 2003

(54) NUMERICALLY CONTROLLED OSCILLATOR IN PARTICULAR FOR A RADIOFREQUENCY SIGNAL RECEIVER

(75) Inventors: Pierre-André Farine, Neuchâtel (CH); Jean-Daniel Etienne, Les Geneveys-sur-Coffrane (CH); Ruud Riem-Vis, Neuchâtel (CH); Elham Firouzi, Ligerz (CH)

(73) Assignee: Asulab S.A., Marin (CH)

( * ) Notice: Subject to any disclaimer, the term of this patent is extended or adjusted under 35 U.S.C. 154(b) by 0 days.

(21) Appl. No.: 09/988,276

(22) Filed: Nov. 19, 2001

(65) Prior Publication Data
US 2002/0075077 A1 Jun. 20, 2002

(30) Foreign Application Priority Data
Dec. 15, 2000 (CH) .............................................. 2449/00

(51) Int. Cl.⁷ ............................................. H03B 21/00
(52) U.S. Cl. ........................ 327/106; 327/113; 327/129
(58) Field of Search ................................. 327/105, 106, 327/107, 113, 114, 141, 144, 145, 146, 155, 129; 708/270, 271, 272, 273

(56) References Cited

U.S. PATENT DOCUMENTS

| 4,241,308 A | * | 12/1980 | Cellier et al. ................. 327/114 |
| 5,142,487 A | * | 8/1992 | Graham, III ................. 708/276 |
| 5,224,125 A | * | 6/1993 | Wong et al. ................... 375/82 |
| 5,371,765 A | | 12/1994 | Guilford ...................... 375/119 |
| 5,521,534 A | * | 5/1996 | Elliott ......................... 327/129 |
| 5,646,967 A | | 7/1997 | Hee et al. .................... 375/373 |
| 5,673,212 A | * | 9/1997 | Hansen ........................ 708/271 |
| 6,232,878 B1 | * | 5/2001 | Rubin ....................... 340/572.1 |
| 6,252,464 B1 | * | 6/2001 | Richards et al. ................ 331/4 |
| 6,320,431 B1 | * | 11/2001 | Potson et al. ................ 327/106 |

FOREIGN PATENT DOCUMENTS

EP 414 445 2/1991

* cited by examiner

Primary Examiner—Timothy P. Callahan
Assistant Examiner—Hai L. Nguyen
(74) Attorney, Agent, or Firm—Sughrue Mion, PLLC (57) ABSTRACT

The numerically controlled oscillator (8) is mounted in particular in a radiofrequency signal receiver which further includes means (3) for receiving and shaping the radiofrequency signals, a correlation stage (4) and a clock signal generator. The oscillator receives at one input a clock signal with a first frequency (CLK) which clocks the oscillator operations, and a binary word of several bits (Nb) to provide at one output at least an output signal (Mb) with a frequency determined as a function of said binary word and the clock signal. The oscillator includes a first accumulation stage (12) for a first number of most-significant bits (Ob) of the binary word and a second accumulation stage (12) for a second number of least-significant bits (Pb) of said binary word. The first accumulation stage is clocked at the first clock frequency (CLK) to supply the determined frequency output signal (Mb), while the second stage is clocked at a second clock frequency (CLK/N) N times lower than the first clock frequency. Output bits (Qb) or binary signals from the second stage are multiplied by N to be introduced at the input of the first stage every N cycles of the clock signal at the first frequency (CLK).

13 Claims, 3 Drawing Sheets

NUMERICALLY CONTROLLED OSCILLATOR IN PARTICULAR FOR A RADIOFREQUENCY SIGNAL RECEIVER

BACKGROUND OF THE INVENTION

The present invention concerns a numerically controlled oscillator in particular for a radiofrequency signal receiver, such as a GPS type receiver. Such an oscillator is intended to receive at one input a clock signal with a first frequency clocking the oscillator operations, and a binary word defined by several bits, and to provide at one output at least a signal with a frequency determined as a function of said binary word and the clock signal.

The output signal with a determined frequency is a signal which is basically a succession of rectangular voltage pulses wherein the width of the pulses and intervals between two pulses are not necessarily uniform over a given period of time. It should be noted that this output signal may be considered as a succession of bits in series taking the values 1 or 0 at each clock stroke as a function of the binary word imposed at the input of the oscillator. Of course, said oscillator may provide at its output more than one output signal each defined by a different succession of bits in series.

These numerically controlled oscillators are used inter alia in fields of applications where the environment is noisy. In a noisy environment, the signals used have to be extracted from the greatly disturbed radiofrequency signals while keeping a fine frequency resolution for the oscillators. These fields of applications are for example the cellular telephone or mainly radiofrequency signal receivers, such as GPS receivers.

In the case of radiofrequency signal receivers, the signals received are generally demodulated to extract the message from said radiofrequency signals. Numerically controlled oscillators are usually placed in demodulation loops of the correlation stages of such receivers. These oscillators allow signals to be supplied at a determined frequency or corrected for example to generate a replica of the carrier frequency of the received radiofrequency signals. This frequency replica is then multiplied in the correlation stage by the signals shaped in said receivers in order to be able to extract the useful signals.

In the case more precisely of GPS type receivers, a first numerically controlled oscillator is placed in the loop for generating carrier frequency replica of the received signal. A second numerically controlled oscillator is placed in the loop for generating the replica of the characteristic pseudo-random code PRN of the satellite to be tracked.

These GPS type radiofrequency receivers include in particular a receiving antenna for radiofrequency signals originating from satellites, a receiving and shaping stage for radiofrequency signals provided by the antenna, and a correlation stage receiving intermediate signals shaped by the receiving stage. The correlation stage is formed of several channels which each include a correlator. Each correlator thus includes the two numerically controlled oscillators described above.

Said receivers also include a microprocessor connected to the correlation stage and intended to calculate X, Y, Z position, speed and time data as a function of the data extracted, after correlation, from the GPS signals transmitted by the satellites. The data extracted from the GPS signals are the GPS message and pseudo-ranges. Four visible satellites are normally needed to determine the position, speed and local time for example.

It should be noted that the satellites, which are currently 24 in number in orbit around the Earth, transmit radiofrequency signals carrying ephemerides and almanac data messages which are used in particular to calculate position. These radiofrequency signals are formed of a first carrier frequency L1 at 1,57542 GHz on which are modulated the P-code at 10,23 MHz and the C/A PRN code at 1,023 MHz particular to each satellite with the GPS message at 50 Hz. Said satellites also transmit a second carrier frequency L2 at 1,2276 GHz on which are modulated the Pcode at 10,23 MHZ with the GPS message at 50 Hz. In civilian applications, only carrier frequency L1 with the C/A code is used by the terrestrial receivers for calculating, in accordance with the GPS message, the X, Y and Z position, speed and time.

The C/A PRN code (pseudo random noise) of each satellite, which is also called the Gold code, is a unique pseudo-random code for each satellite so as to be able to distinguish the signals transmitted by the satellites inside the receiver.

This pseudo-random PRN code is a digital signal which is formed of 1023 chips and which is repeated every millisecond. This repetition period is also defined by the term "epoch" of the Gold code. It is to be noted that a chip takes values 1 or 0 like a bit. However, a chip (a term used in GPS technology) should be distinguished from a bit which is used to define a unit of data.

The Gold codes are defined for 32 satellite identification numbers which leaves a free choice for the specific code allocated to each additional satellite which will be put into orbit on one of the orbital planes. The GPS receivers generally include the data for these codes in a memory, as well as the estimated position of each corresponding satellite in orbit. Consequently, binary words relating to the code frequency of a satellite and to the estimated carrier frequency can be provided to the oscillators used in the demodulation loops to allow quicker locking onto the visible satellites.

Figure 1A:
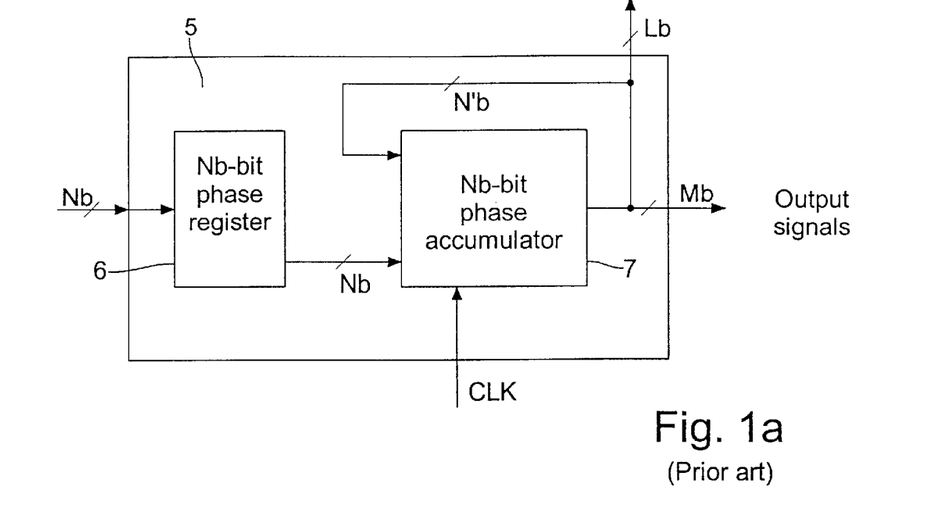
FIG. 1a which has already been cited shows schematically a numerically controlled oscillator of the prior art.

By way of example, FIG. 1a shows schematically a numerically controlled oscillator of this type which is commonly used in radiofrequency signal receivers. Oscillator 5 receives at its input a phase binary word with Nb bits in parallel which is placed in an Nb-bit phase register 6. In demodulation loops, it is mainly phase offset binary words which are introduced into the numerically controlled oscillator. Register 6 supplies the stored number Nb of bits to a phase accumulator 7 which is clocked by a clock signal CLK. Output lines N'b from accumulator 7 are connected to inputs of said accumulator so that output bits or binary signals in parallel on said lines are added to number Nb of bits at each clock stroke. Normally, the number N'b of output bits is equal to number Nb of binary word bits. Lb bits outputting from the accumulator are directed to the microprocessor in particular to perform a real time phase calculation. A number Mb of binary signals are provided as output signals with a frequency determined by the oscillator. The number Mb of output bits does not need to be equal to all the Nb bits inputted into the oscillator. In most cases, only certain most-significant bits are used to define the output signals.

In most radiofrequency receiver applications, such as GPS receivers, reduction in power consumption has become a necessity. This reduction in power consumption is particularly essential when such receivers are incorporated in objects of small dimensions which include battery or accumulator power supply. Such objects are for example a watch or a portable telephone.

This power consumption of the receivers must not be too great in these small objects in order to avoid the battery of the object being changed too frequently or an energy accumulator having to be systematically recharged after short time periods. It is to be noted that the smaller the battery depending on the size of the portable object, the more necessary it is to design small electronic units for the GPS receiver integrated circuits. Moreover, the manner in which the signals are processed in said circuits to extract the GPS message and the pseudo-distances of each satellite picked up has to be taken into account.

The standard numerically controlled oscillator, described hereinbefore with reference to FIG. 1a, constitutes a significant part of the power consumption of the whole correlation stage of a radiofrequency signal receiver, such as a GPS receiver. This oscillator has to be sufficiently large to have a small frequency resolution. Clock frequency CLK is often greater than several megahertz depending on the sampled and quantified signals to be processed, which means that all the components of the oscillator operate at a very high frequency. This thus generates a high power consumption which is a major drawback of such standard oscillators.

Japanese Patent Application No. 8-338865 discloses a GPS receiver. A numerically controlled oscillator of the type described hereinbefore is mounted in this receiver for the purpose of reducing the number of components in the carrier frequency replica generating loop. In order to do this, it is proposed to add a most-significant bit to several least-significant bits in an adder. The most-significant bits are then kept in a register in order to be placed at the input of the adder for a subsequent adding operation. In this embodiment, a search table at the oscillator output is no longer necessary to generate the quarter-phase signals of the carrier frequency replica. The quarter-phase signals are supplied by two output signals of the oscillator through a XOR logic gate and by one of the two output signals through an inverter. The two oscillator output signals used are the two most-significant bits of the output signals. Despite the reduction in the number of the oscillator loop output components, there is no significant reduction in power consumption of the oscillator itself. This oscillator as a whole thus still operates at a very high clock frequency which is a drawback.

SUMMARY OF THE INVENTION

One object of the invention consists in providing a numerically controlled oscillator in particular for a radiofrequency signal receiver capable of reducing energy consumption as much as possible while overcoming the drawbacks of oscillators of the prior art. The small frequency resolution is kept equal to the oscillators of the prior art, but conversely, energy consumption is greatly reduced.

This object, in addition to others, are achieved by the aforecited numerically controlled oscillator in particular for a radiofrequency signal receiver, which is characterised in that it includes a first accumulation stage for a first number of most-significant bits of the binary word and a second accumulation stage for a second number of least-significant bits of said binary word, the first accumulation stage being clocked by the clock signal at the first frequency to supply the output signal at a determined frequency, while the second stage is clocked by a clock signal at a second frequency N times lower than the first clock frequency, a certain number of output bits or binary signals from the second stage being introduced at the input of the first stage every N cycles of the clock signal at the first frequency.

One advantage of the multiphase numerically controlled oscillator consists in reducing the energy consumption by only working for example half of the oscillator during N cycles of a clock signal at a first frequency. The resolution of this multiphase oscillator is not reduced with respect to a standard numerically controlled oscillator. This first clock frequency is of the order of several megahertz. Consequently, if half or more of the oscillator remains on standby during N clock strokes at the first frequency, this allows the energy consumption of the oscillator to be greatly reduced.

This multiphase oscillator is especially useful in a noisy environment as in the case of GPS type radiofrequency signals.

A certain number of most-significant bits of the binary word are introduced into the most-significant bit accumulation stage which operates at the first clock frequency. This part is the most important part of the oscillator to be able to keep the same frequency resolution as that of a conventional oscillator. The least-significant bits of the binary word are introduced into the least-significant bit stage which operates, at a second frequency N times lower than the first frequency. The influence of the least-significant bits has only a long term effect. Consequently, the output bits or binary signals from this accumulation stage multiplied by N are only introduced into the most-significant bit accumulation stage after N cycles of the first clock frequency.

N is a power of 2, i.e. N is preferably chosen to have a value $2^m$ where m is an integer number greater than 0 to define a binary number. The value of N may be fixed for example at 16, which means that the second clock frequency is 16 times lower than the first frequency. The energy consumption of the multiphase oscillator can be evaluated as being approximately half of that of a conventional oscillator if the numbers of most-significant and least-significant bits are uniformly distributed in each accumulation stage.

The clock frequencies used in the receiver are adapted as a function of the frequencies of the received radiofrequency signals in order to clock several parts in an identical manner. This has the effect of also reducing the number of electronic elements in particular in the correlation stage and consequently the receiver's energy consumption. Moreover, a reduction in energy consumption is achieved by converting or compressing the frequency of the radiofrequency signals going to the correlation stage.

BRIEF DESCRIPTION OF THE DRAWINGS

The objects, advantages and features of the multiphase numerically controlled oscillator will appear more clearly in the following description of embodiments of the invention illustrated by the drawings, in which.

DETAILED DESCRIPTION OF THE INVENTION

In the following description, the multiphase numerically controlled oscillator will be explained only with reference to use in a low power radiofrequency signal receiver, for example a GPS type receiver. This receiver is placed in a device which includes a battery or an accumulator for the electric power supply of the receiver's components. However, the use of such a multiphase oscillator may also be justified in any other device which could be placed in a noisy or disturbed environment, for example in the cellular telephone communication field.

As will be described with reference to FIG. 3, two multiphase numerically controlled oscillators are placed in two loops of the correlation stage of a GPS receiver. One loop concerns the generation of the carrier frequency replica of the radiofrequency signals received by the receiver. Another loop concerns the generation of a pseudo-random PRN code representative of a satellite to be tracked. The function of these oscillators is to supply at the output a signal with a determined frequency. Said frequency depends on a binary word placed at the oscillator input, as well as on the clock signal for the oscillator operations.

Figure 1B:
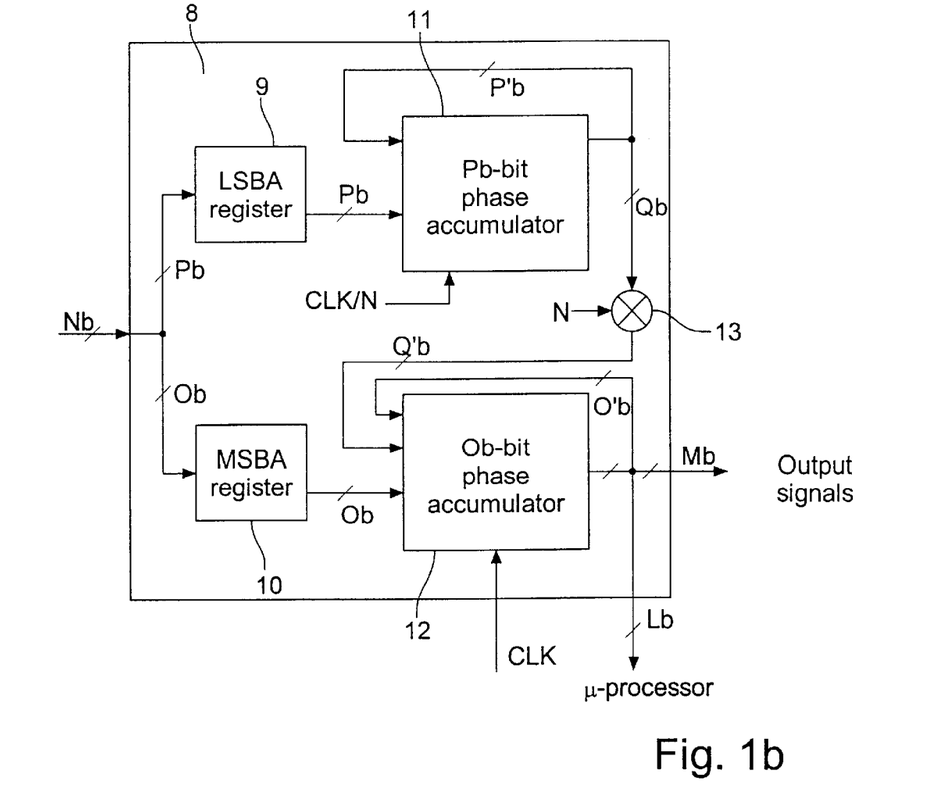
FIG. 1b shows schematically a numerically controlled oscillator of the multiphase type according to the invention.

FIG. 1b shows the main electronic units of a multiphase numerically controlled oscillator 8 which operates in a bit-parallel architecture. This oscillator 8 essentially includes a first accumulation stage for a number Ob of most-significant bits of the binary word with Nb bits received at its input and a second accumulation stage for a number Pb of least-significant bits of said binary word.

The second accumulation stage is formed of a phase register 9, called the LSBA register (Least Significant Bit Accumulator), for the Pb least-significant bits of the binary word, followed by a phase accumulator 11 supplying a certain number of output signals or output bits. The Pb bits stored in register 9 are placed at the input of accumulator 11 to be added at each clock stroke at the second frequency CLK/N to P'b preceding output bits of accumulator 11. Normally, the P'b preceding output bits are in an equal number to the Pb bits from register 9. At each clock stroke at the second frequency imposed on the accumulator, a running total addition is performed at the output of accumulator 11. The design of such an accumulator is well known to those skilled in the art in this technical field.

A certain number of output binary bits or signals Qb from phase accumulator 11 are multiplied by N in a multiplier or multiplexer 13. This multiplication corresponds for a binary number ($2^n$) to a shift of N positions of the output bits towards the most-significant bits. The number Q'b of multiplied bits is introduced at the input of the first accumulation stage for addition to the Ob most-significant bits. This bit number Q'b only changes value after N cycles of the clock signal at first frequency CLK. In the present case, bit number Q'b is equal to bit number Qb.

The first accumulation stage is formed, like the second stage, of a phase register 10, called register MSBA (Most Significant Bit Accumulator), for the Ob most-significant bits of the binary word. Register 10 is followed by a phase accumulator 12 supplying a certain number of output binary signals or bits including the determined frequency output signal or signals Mb. The signal or signals Mb are selected from among the most-significant bits at the output of accumulator 12. The Ob bits stored in register 10 are placed at the input of accumulator 12 like the Q'b bits originating from the second accumulation stage. An addition of the Ob bits and the Q'b bits is performed on each clock stroke at first frequency CLK to O'b preceding output bits from accumulator 12. Normally, the O'b output bits are in an equal number to the Ob bits originating from register 10. As for the second accumulation stage, a running total addition is performed at the output of accumulator 12 on each clock stroke at first frequency CLK.

Several output bits Lb from accumulator 12 are directed to a microprocessor of the receiver to perform for example a real time calculation of the phase or pseudo-range.

The first accumulation stage is clocked by a clock signal at a first frequency CLK which can have a value for example of 4.36 MHz for application in a low power GPS receiver. The second accumulation stage is clocked by a clock signal at a second frequency CLK/N which is N times less than first clock frequency CLK.

The value N is defined as a multiple of 2. This value N is selected preferably to be $2^m$, where m is an integer number greater than 0 to define a position of a binary number. For this oscillator, the second clock frequency is for example fixed at 16 times less than the first clock frequency. It may thus have a value of 272.5 kHz in the present case.

Every 16 clock strokes at first clock frequency CLK, a different carry-over of the output bits from the second accumulation stage is applied to the input of the first most-significant bit accumulation stage in order to make a final correction to the output signal or signals of the first stage. Since the change in the adding carry-over does not occur at each clock stroke of the first stage, a great saving of energy is achieved.

For a low power GPS receiver, a multiphase numerically controlled oscillator is placed in the carrier frequency replica generating loop. The binary word supplied at the input of said carrier NCO oscillator is fixed for example at 24 bits which is divided for example into 12 most-significant bits Ob and 12 least-significant bits Pb. The 12 bits Ob occupy the positions [23:12] in the binary word, whereas the 12 bits Pb occupy the positions [11:0] in said binary word. With reference to FIG. 1b, in theory only 6 most-significant bits Qb or Q'b of the output bits P'b from accumulator 11 are used for the first accumulation stage.

Since the frequency of the carrier replica has to be corrected taking account of frequency offsets due in particular to the Doppler effect, a binary word is introduced into the oscillator which corresponds to a carrier replica correction phase or phase offset. The frequency resolution $\Delta f_{min}$ with such a multiphase 24-bit NCO oscillator is defined by the formula below:

$$\Delta f_{min} = f_{CLK} 2^{-Nb}$$

Since the clock frequency $f_{CLK}$ is 4.36 MHz in the present case, this gives a frequency resolution which is equivalent to 260 mHz.

Another multiphase numerically oscillator is placed in the pseudo-random code PRN generating loop. The binary word supplied the input of said code NCO oscillator is fixed for example at 28 bits which are divided for example into 14 most-significant bits Ob and 14 least-significant bits Pb. The 14 bits Ob occupy the positions [27:14] in the binary word, whereas the 14 bits Pb occupy the positions [13:0] in said binary word. With reference to FIG. 1b, in theory only 6 most-significant bits Qb or Q'b of the output bits P'b from accumulator 11 are used for the first accumulation stage.

Since an output signal which corresponds to the clock signal has to be provided for a pseudo-random code generator, a binary word is introduced into multiphase code NCO oscillator which corresponds to a phase or phase offset for generating the PRN code replica. Account must be taken for the phase of the radiofrequency signals, as well as an offset of the carrier frequency for the binary word of the code NCO oscillator. The frequency resolution $\Delta f_{min}$ with such a multiphase 28-bit NCO oscillator is of the order of 16 mHz.

Whether it is for the multiphase carrier NCO oscillator or for the multiphase code NCO oscillator, since there is a uniform distribution between the most-significant and least-significant bits, the energy consumption at a first approximation is half of that of a standard oscillator. Of course, in order to further reduce energy consumption, the number of most-significant bits could be further reduced at the expense of the number of least-significant bits. However, the phase error may slightly increase in this case. Moreover, the number of bits for said oscillators could be different from the previously defined 24 and 28 bits.

The binary word supplied at the input of the oscillator by a preceding discriminator of the demodulation loop is modified after a certain number of integration cycles where each cycle has a duration of a millisecond (epoch). In the present case, one has chosen to modify the binary word supplied to the oscillator after 16 cycles, i.e. after 16 ms.

Figure 2:
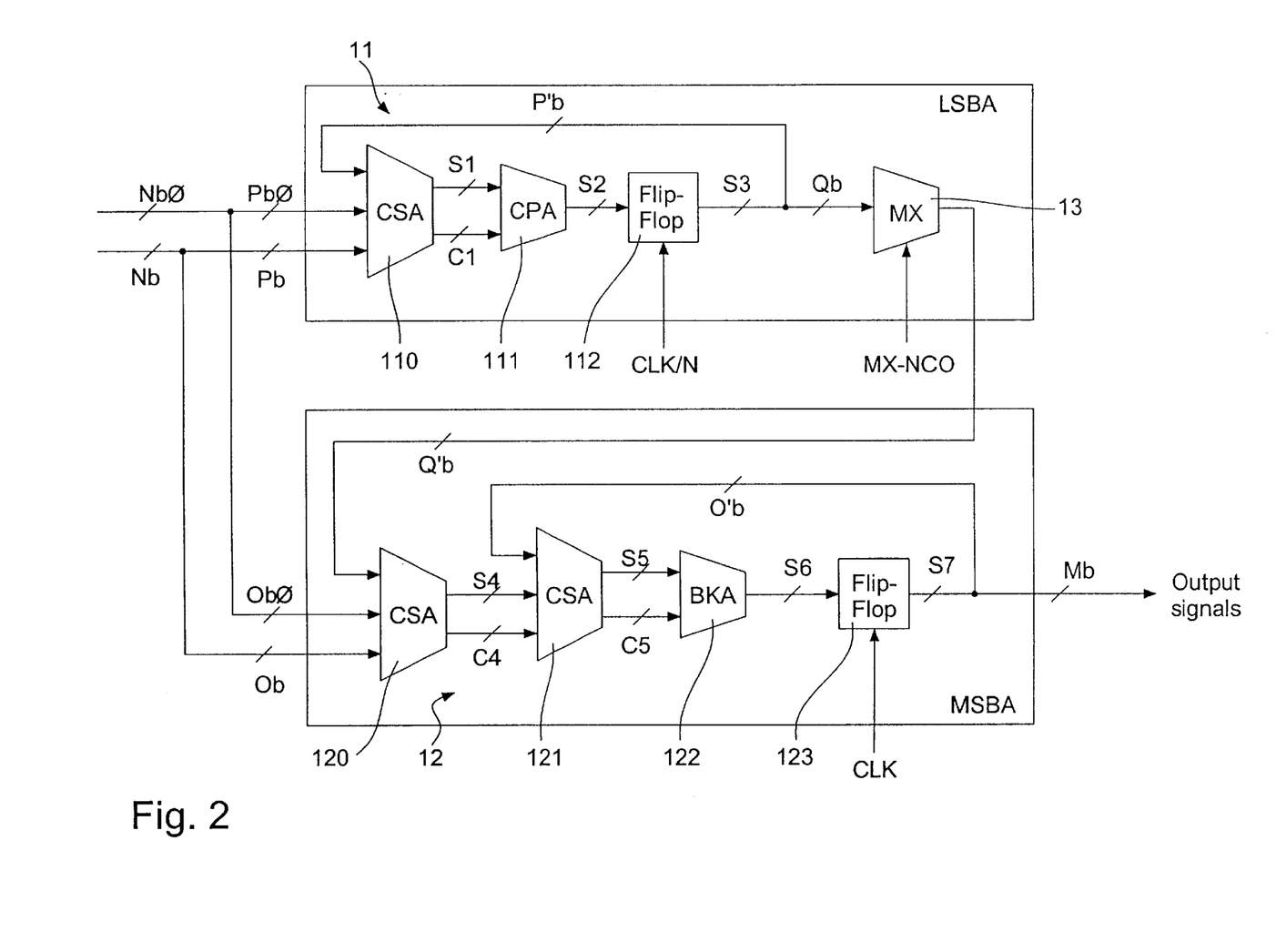
FIG. 2 shows in more detail an embodiment of the multiphase type numerically controlled oscillator according to the invention.

In FIG. 2, an embodiment of the multiphase numerically controlled oscillator (NCO) is shown in more detail. It is to be noted that for the sake of simplification, the input registers for two binary words are not shown to avoid overloading FIG. 2. This oscillator may be used both in the carrier frequency replica loop and in the pseudo-random code replica generating loop.

Two binary words, referenced Nb and Nbø, are introduced at the oscillator input. The first binary word with Nb bits concerns a phase offset or a phase or frequency increment which is generated in the carrier or code loop after the correlation and integration operation has been performed. The second binary word with Nbø bits stays fixed during the entire demodulation operations. This second binary word concerns a value relating to the code or frequency carrier extracted from a memory of the receiver. Moreover, this second binary word is necessary to allow quicker locking on to the visible searched, since the received radiofrequency signals are greatly disturbed.

It is to be noted that the pseudo-random codes and the carrier frequencies of the radiofrequency signals are well known. Several data relating to the satellites in orbit are stored in a memory connected to the receiver microprocessor. This data concerns the position of said satellites, their Gold code, and those which are capable of being visible to the terrestrial GPS receiver when it is switched on. Said microprocessor can thus calculate the position in orbit of a satellite to be tracked in order to find out the carrier frequency corrected as a function of offsets due in particular to the Doppler effect, and to determine the satellite phase code. This second binary word is added to the first binary word of the loop in the oscillator to allow the useful signal to be extracted from the disturbed signal in the demodulation loops.

The bit number of the first binary word is equal to the bit number of the second binary word. A same number of most-significant bits Ob and Obø of the first and second binary words is introduced into the first most-significant bit accumulation stage 12. A same number of least-significant bits Pb and Pbø of the first and second binary words is introduced into second accumulation stage 11.

This second accumulation stage 11 first of all includes a carry save adder 110 (CSA) which receives at its input the least-significant bits Pb and Pbø of the first and second binary words. Output bits S1 with carry bits C1 from adder 110 are introduced at the input of a carry propagate adder 111 (CPA). The output bits S2 from adder 111 are placed at the input of a flip-flop stage 112 which is clocked by the second clock frequency CLK/N, which may have a value of 272.5 kHz. On each clock stroke CLK/N made on flip-flop stage 112, new binary signals S3 or output bits are generated. A number P'b of output bits from the flip-flop stage is introduced at the input of adder 110 as discussed with reference to FIG. 1b. This number of output bits S3 is equal to bit number P'b, thus on every clock stroke at second frequency CLK/N, new binary signals or output bits P'b are added in adder 110 to the least-significant bits Pb and Pbø.

A certain number Qb of output bits from flip-flop stage 112, which are mainly the most-significant bits, are placed at the input of a multiplier or multiplexer 13. A control signal MX-NCO allows the running total addition of the Qb output bits to be carried to the first accumulation stage. This control signal has an equivalent frequency to second clock frequency CLK/N. A multiplication or more precisely a shift of N positions towards the most-significant bits is performed on the Qb output bits in order to provide a multiplied bit number Q'b to the input of the first accumulation stage.

First accumulation stage 12 includes first of all a first carry save adder (CSA) 120 which receives at its input the Ob and Obø most-significant bits of the first and second binary words, as well as the Q'b bits of second accumulation stage 11. Output bits S4 with carry bits C4 from adder 120 are introduced at the input of a second carry save adder 121. Output bits S5 and carry bits C5 from adder 121 are placed at the input of a Brent & Kuhn type adder (BKA) 122, which corresponds to a carry propagate adder (CPA). Output bits S6 from adder 122 are placed at the input of a flip-flop stage 123 which is clocked by first clock frequency CLK, which may have a value of 4.36 MHZ. On each clock stroke CLK on flip-flop stage 123, new binary signals S7 or output bits are generated. A number O'b of output bits from flip-flop stage 123 is introduced at the input of adder 121 as discussed with reference to FIG. 1b. This number of output bits S7 is equal to the number O'b of bits, thus on each clock stroke at first frequency CLK, new binary signals or output bits O'b are added in adder 121 to output bits S4 and carry bits C4. One or two determined frequency output signals Mb are extracted from output bits S7. These signals Mb are selected from among the most-significant bits of output bits S7.

As regards the making of adders CSA or CPA, the reader may refer for more details for example to U.S. Pat. No. 4,110,832 which discloses a carry save adder, or to the articles entitled "Fast carry save adder" of November 1990 at pages 157 to 159 (ref 90A 63170) and "Adder Architecture" of March 1981 at pages 4587 to 4590 (ref 81A 02029) of the IBM Technical Disclosure Bulletin. As regards the Brent & Kuhn adder, reference may be made to the article entitled "A Regular Layout for Parallel Adders" by R. P. Brent and H. T. Kuhn, drawn from IEEE Trans. on Computers, vol. 31, pages 260 to 264 of March 1982.

In the case of a multiphase code oscillator, the output signal Mb corresponds to the clock signal PRN-CLK corrected for the pseudo-random code generator. Conversely, in the case of a multiphase carrier oscillator, two output signals Mb are generated to be introduced into logic gates for generating quarter-phase signals of the carrier frequency replica.

The low power GPS receiver can be mounted for example in a wristwatch. This watch has an accumulator or battery of small size, which means that the power consumed has to be as low as possible when the GPS receiver is working. It is for these reasons that the GPS receiver is provided with multiphase numerically controlled oscillators, since the essential energy consumption is due to the oscillators and integrators in the correlation stage.

Figure 3:
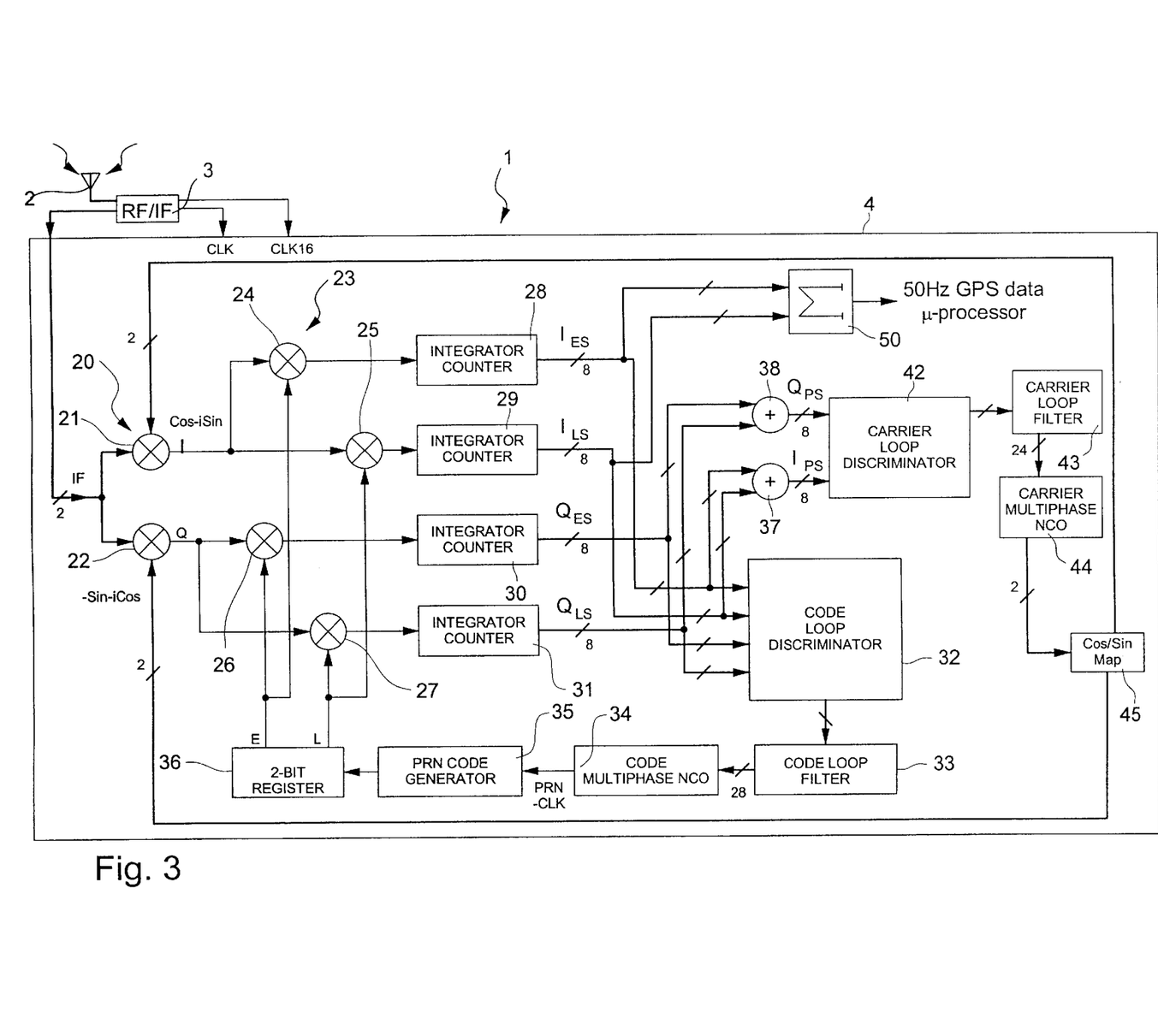
FIG. 3 shows schematically a GPS receiver which includes a correlation stage of a channel having two multiphase numerically controlled oscillators according to the invention.

FIG. 3 shows a low power GPS receiver 1. It is formed first of an antenna 2 for receiving radiofrequency signals from several satellites and a receiving and shaping stage 3 for the radiofrequency signals provided by antenna 2. The receiver also includes a correlation stage 4 receiving intermediate signals IF in complex form at the output of receiving stage 3, and a microprocessor which is not shown for processing the GPS message. Said correlation stage is formed of several channels, for example 12 in number, but a single channel is shown in FIG. 3.

In receiving stage 3, intermediate complex signals IF are provided at a frequency of 400 kHz by sampling at 4.36 MHz at the correlation stage. This intermediate complex signal IF is thus formed of an in-phase signal I and a quarter-phase signal Q.

Since, in half of these cases, the signals processed in the shaping stage give signals of different parity (+1 and −1), this parity must thus be taken into account for the GPS signal demodulating operations in the receiver.

In the case of a low power GPS receiver, it is recommended that intermediate signals IF be output at 1-bit quantification for the carrier frequency, even if this quantification generates an additional loss of the order of 3 dB on the signal noise ratio (SNR).

A clock signal generator in shaping stage 3 includes for example a quartz oscillator, for supplying clock signals. In the application of the low power GPS receiver, the quartz oscillator is followed by frequency dividers to be able to provide a first clock signal CLK of 4.36 MHz, and a second clock signal at a frequency N times lower than the first clock signal. This second clock signal CLK16 is for example fixed at 272.5 kHz which corresponds to a value of N equal to 16.

These two clock signals enable several parts of the correlation stage to be clocked, in particular the two numerically controlled oscillators described hereinbefore.

It is to be noted that the frequency of 4.36 MHz could be much smaller, since two criteria define this value. The first criterion relates to the complex sampling algorithm where the bandwidth of the anti-overlapping filter limits the clock frequency to a minimum of 3 MHz. The second criterion is the clock frequency which has to be asynchronous with those of the PRN code (1.023 MHz) and the carrier (400 kHz). As a function of certain criteria of the shaping stage RF/IF, said first clock frequency has been fixed at 4.36 MHz.

The data of the demodulated messages are signals at a frequency of 50 Hz which are provided to the microprocessor which follows the correlation stage.

As previously described, several radiofrequency signals originating from several satellites are received at the antenna. Since their C/A codes are orthogonal, the receiver channels can work simultaneously to each lock onto a respective satellite.

The intermediate signals IF provided to the correlation stage include noise which is generally approximately 16 dB greater than the useful signals, this is why it is necessary to know the shape of the signals which the receiver has to demodulate. This serves to assure correlation of the IF signals and demodulation of the GPS message for the microprocessor once the channels have each locked onto a respective visible satellite.

In a first satellite search phase, the frequency parameters are established and the PRN code is loaded in order for the channel to be able to begin searching. It examines all the possible phases in a single carrier frequency with a resolution of one chip. When the satellite has been found, the circuit locks onto the signal while the internally generated carrier and code frequencies are adapted. As long as the power of the signal is sufficient, the channel continues synchronising the bits and extracts the GPS messages.

In order to determine the pseudo-range, the state of the PRN code generator is transferred for each channel simultaneously, and as well as the current code phase of the multiphase NCO oscillator. This allows information to be found as to the distance which separates the receiver from the satellite with a resolution of less than a microsecond. However, it is necessary to lock onto at least four satellites for the microprocessor to be able to extract all the position, speed and time data.

The correlation stage of a receiver channel will be explained hereinafter in detail with reference to FIG. 3. This correlation stage is shown with a part for the PRN code control loop and another part for the carrier frequency control loop. For more detail relating to this correlation stage, the reader may refer to the teaching drawn from the book "Understanding GPS Principles and Applications" at chapter 5 by Philip Ward and by editor Elliott D. Kaplan (Artech House Publishers, USA 1996) ISBN edition number 0-89006-793-7. The reader may also refer to chapter 8 entitled "GPS receivers" by A. J. Van Dierendonck of the book "Global Positioning System and Applications" published by the American Institute of Aeronautics and Astronautics in 1996.

In the correlation stage, the punctual component has been removed from the code control loop for the sake of energy saving, but a loss in the signal to noise ratio of the order of 2.5 dB is observed.

Intermediate signal IF, represented in FIG. 3 by a bold line intersected by an oblique line defining 2 bits, is a complex signal (I+iQ) formed of a 1-bit in-phase signal I and a 1-bit quarter-phase signal. Said intermediate signal IF has been sampled and quantified, and is first passed through a carrier multiplier stage 20. A multiplier 21 multiplies signal IF by the cosines minus i times the sinus of the internally generated carrier replica in order to extract the in-phase signal I from the complex signal. A multiplier 22 multiplies signal IF by the minus sinus minus i times the cosines of the internally generated carrier replica in order to extract the quarter-phase signal Q from the complex signal.

After this operation the equivalence of the signal PRN code of a satellite to be acquired has to be found in a channel switched on with a PRN code generated in said channel corresponding to the desired satellite. In order to do this, the in-phase and quarter-phase signals pass through a second stage of multipliers 23 to correlate signals I and Q with an early replica and a late replica of the PRN code to obtain four correlation signals. In each channel of the correlation stage, only the early and late replica have been kept in place of the three replicas usually without taking account of the punctual replica. This allows the number of correlation elements to be minimised.

Multiplier 24 receives signal I and early replica signal E from a 2-bit register 36 and supplies a correlated early in-phase signal. Multiplier 25 receives signal I and late replica signal L from register 36 and supplies a late in-phase correlated signal. Multiplier 26 receives quarter-phase signal Q and early signal E, and supplies a correlated early quarter-phase signal. Finally, multiplier 27 receives signal Q and late replica signal L, and supplies a correlated late quarter-phase signal. The phase offset between early replica E and late replica L is half a chip in the embodiment of the present invention, which means that the phase offset with a punctual central component P is ¼ of a chip. The multipliers may be made for the sake of simplification using XOR logic gates for example.

As regards the early and late signals which are half a chip apart, they are used in order to pick up the point of energy detected when the satellite is acquired, which makes the use of punctual signals superfluous, with the object of avoiding any unnecessary consumption in the low power GPS receiver. Nonetheless, the use of these early and late components is sufficient to acquire the satellite.

The four correlated signals each enter one of the integrator-counters 28, 29, 30, 31, which are pre-detection elements, the output values $I_{ES}$, $I_{LS}$, $Q_{ES}$ and $Q_{LS}$ are shown at 10 bits which means that a complete cycle of the C/A PRN code was required to find said values. A complete set of values $I_{ES}$, $I_{LS}$, $Q_{ES}$ and $Q_{LS}$ is obtained every millisecond or every epoch. All the operations in the loops which follow these integrators occur in a bit-parallel architecture with signals at a frequency of 1 kHz. In order to remove a part of the noise of the useful signal to be demodulated, only the 8 most-significant bits are used for the rest of the digital signal processing chain.

The values of signals $I_{ES}$, $I_{LS}$, $Q_{ES}$ and $Q_{LS}$ represented in the Figure by a bold line intersected by an oblique line defining 8 bits, are passed into a code loop discriminator 32 and into a code loop filter 33. The code loop discriminator performs the calculating operations of the energy of signals $I_{ES}$, $I_{LS}$, $Q_{ES}$ and $Q_{LS}$. The discriminator is a non coherent discriminator of the delay lock loop (DLL) type which is well known to those skilled in the art. It is formed in particular of an 8-bit multiplier and a 20-bit accumulator. Over this discriminator, a correction is made from the carrier loop, since during emission of the signal by the satellite, the Doppler effect is felt not only on the carrier frequency, but also on the PRN code which is modulated on the carrier frequency. The contribution of the carrier in the code loop discriminator corresponds to a division by 1540 of the carrier offset increment.

Depending on the filtered result of the discriminator, a phase increment is imposed on the 28-bit NCO. The multiphase NCO oscillator corrects the frequency of clock signal PRN-CLK to clock PRN code generator 35 in order for it to transmit the series of bits of the C/A PRN code to register 36 to make a new correlation. The frequency resolution of this 28-bit NCO is of the order of 16 mHz. In the NCO of the code, in addition to the first binary word of the phase increment, the second binary word is also entered, which corresponds to the ideal frequency value for the PRN code, i.e. a frequency of 1.023 MHz.

After synchronising and locking onto the desired satellite, the values $I_{ES}$ and $I_{LS}$ are introduced into a demodulation element 50 able to provide the data message at 50 Hz over 1 bit to the microprocessor. In addition to the message, the microprocessor can use in particular the data concerning the pseudo-ranges introduced in the buffer register in order to calculate the X, Y and Z position, speed and precise universal time.

None of the elements explained hereinbefore will be described in any more detail, given that they form part of the general knowledge of those skilled in the art in this technical field.

With reference to FIG. 3, signal IF is multiplied by the cosines minus i times the sinus of the internally generated carrier replica in multiplier 21 and by the minus sinus minus i times the cosines of the internally generated carrier replica in multiplier 22. These sin and cos signals originate from a unit 45 of a COS/SIN table for the replica signal. The object is to extract definitively the carrier frequency from the signals carrying the GPS message.

The sum of signals $I_{ES}$ and $I_{LS}$, in adder 37 is used to create signal $I_{PS}$ and the sum of signals $Q_{ES}$ and $Q_{LS}$ in adder 38 is used to create signal $Q_{PS}$, both represented over 8 bits.

These values are introduced at a frequency of 1 kHz into a carrier loop discriminator 42 (envelope detection) to calculate the signal energy followed by a carrier loop filter 43. The discriminator comprises in particular an 8-bit multiplier and a 20-bit accumulator. It is of the frequency and phase lock loop type.

An averaging operation is performed on the frequency discriminator in order to increase the robustness and precision of the carrier tracking loops. As defined previously, the accumulation provided in the accumulator lasts for 16 cycles, which corresponds to 16 ms.

Depending on the discriminator result and after passing through the filter, the 24-bit carrier NCO 44 receives a frequency increment (bin) for the carrier frequency replica correction. This 24-bit NCO has a frequency resolution of the order of 260 mHz. In the carrier NCO, in addition to the first binary word of the frequency increment, the second binary word is also entered, which corresponds to the carrier frequency value taking account of the Doppler effect.

The two code and carrier code enslaving procedures are synchronised during tracking, although the carrier tracking loops are only updated after confirmation of the presence of the satellite signal.

The acquisition and tracking algorithms require the satellite carrier frequency replica for demodulation. The elimination of the Doppler effect which may cause frequency errors between ±4.5 kHz inherent in any transmission of radiofrequency signals from the satellites in movement may be removed by adapting either the phase or the frequency of the signal entering the receiver.

Other errors due to the imprecision of the internal oscillator or to the effects of the ionosphere add to errors due solely to the Doppler effect. As a general rule, a frequency offset of up to approximately ±7.5 kHz can be expected. These errors can of course be corrected in the code loop and in the carrier loop during the acquisition and tracking phase.

At each correlation epoch, the PRN code phase can be delayed by increment of 1 chip. This allows the code to be shifted in time in order to find the phase offset of the satellite. Once the satellite has been found the carrier frequency including the Doppler effects which occurs in a control loop of the carrier must be corrected. Since the difference between the received carrier frequency and the generated carrier frequency is limited to more or less 250 Hz, several searches at difference frequencies of the generated carrier may be necessary. In the worst case, up to 20 searches are necessary for correcting the frequency in the carrier NCO.

It should also be noted that the multiphase numerically controlled oscillator defined as NCO must be sufficiently large to have a small frequency resolution, which results in significant power consumption. By making an oscillator of the multiphase type, consumption is reduced by at least a factor 2 or more depending on the distribution of bits in the two stages of the oscillator.

Moreover, in each demodulation loop, account must be taken of a thermal noise and quantification noise of the oscillator which must be minimized. In the case of a multiphase oscillator, the quantification noise is a little greater than for a standard oscillator, but this quantification noise remains much less than the thermal noise. Consequently, the operations in each demodulation loop can be achieved without any major problem.

Of course other embodiments of the multiphase numerically controlled oscillator in particular for a low power GPS receiver could be envisaged by those skilled in the art without departing from the scope of the invention defined by the claims. The output signals of the multiphase oscillator could also be analogue type signals rather than the rectangular-shaped signals described. Likewise, the binary word introduced at the input of the oscillator could have been provided in serial form, but in this case several complications would arise at the oscillator input.

What is claimed is:

1. A numerically controlled oscillator for a radio-frequency signal receiver, said oscillator forming part of a pseudo-random code replica generating loop of a radio-frequency signal receiver, said code being representative of a transmitting satellite, the oscillator receiving at one input a clock signal, with a first frequency which clocks operations of the oscillator, and a binary word of several bits, and the oscillator also providing at one output at least an output signal with a frequency determined as a function of said binary word and the clock signal, wherein said oscillator comprises a first accumulation stage, for a first number of most-significant bits of the binary word, and a second accumulation stage for a second number of least-significant bits of said binary word, the first accumulation stage being clocked at the first clock frequency to supply the determined frequency output signal, while the second stage is clocked at a second clock frequency N times lower than the first clock frequency, a certain number of output bits or binary signals from the second stage being introduced at an input of the first stage every N cycles of the clock signal at the first frequency, and wherein a first input register of the first accumulation stage stores the first most-significant bit number of the binary word which defines a code phase offset, wherein a second input register of the second accumulation stage stores the second number of least-significant bits of said binary word, and wherein the first accumulation stage provides at one output a code clock signal for a pseudo-random code generator as a function of said binary word and the first clock frequency.

2. The oscillator according to claim 1, wherein the number of output bits from the second accumulation stage is multiplied by N in a multiplier or multiplexer before being introduced into the input of the first stage.

3. The oscillator according to claim 1, wherein the first accumulation stage includes at least a first accumulator the output lines of which defining a certain number of parallel output bits or binary signals are connected to inputs of the first accumulator to perform an addition with the first number of most-significant bits of the binary word at every cycle of the first clock frequency, and wherein the second accumulation stage includes at least a second accumulator the output lines of which defining a certain number of parallel output bits or binary signals are connected to inputs of the second accumulator to perform an addition with the second number of least-significant bits of the binary word at each cycle of the second clock frequency.

4. The oscillator according to claim 1, wherein a third input register of the first accumulation stage stores a third number of most-significant bits of a second binary word having an equivalent bit number to the first binary word, said second binary word defining a known code phase extracted from a receiver memory, and a fourth input register of the second accumulation stage stores a fourth number of least-significant bits of the second binary word, the total number of most-significant and least-significant bits being equal to or less than the number of bits of the second binary word.

5. The oscillator according to claim 1, wherein the two accumulation stages each include at the input at least a register for receiving, in a bit-parallel architecture, said binary word bits, a first register receiving the first number of most-significant bits and a second register receiving the second number of least-significant bits, the total number of most-significant and least-significant bits being equal to or less than the number of bits of the binary word.

6. The oscillator according to claim 5, wherein the first accumulation stage includes at the input a third register for receiving in a bit-parallel architecture a third number of most-significant bits of a second binary word, with an equivalent number of bits to the first binary word, and wherein the second accumulation stage includes at the input a fourth register for receiving a fourth number of least-significant bits of the second binary word, the total number of most-significant and least-significant bits being equal to or less than the second binary word bit number.

7. A numerically controlled oscillator for a radio-frequency signal receiver, said oscillator forming part of a frequency carrier replica generating loop of a radio-frequency signal receiver, said oscillator receiving at one input a clock signal, with a first frequency which clocks operations of the oscillator, and a binary word of several bits, the oscillator also providing at one output at least an output signal with a frequency determined as a function of said binary word and the clock signal, wherein said oscillator comprises a first accumulation stage, for a first number of most-significant bits of the binary word, and a second accumulation stage for a second number of least-significant bits of said binary word, the first accumulation stage being clocked at the first clock frequency to supply the determined frequency output signal, while the second stage is clocked at a second clock frequency N times lower than the first clock frequency, a certain number of output bits or binary signals from the second stage being introduced at an input of the first stage every N cycles of the clock signal at the first frequency, and wherein a first input register of the first accumulation stage stores the first most-significant bit number of the binary word which defines a frequency carrier phase offset, wherein a second input register of the second accumulation stage stores the second number of least-significant bits of said binary word, and wherein the first accumulation stage provides at one output over at least two output lines carrier frequency binary signals for a carrier frequency replica generating table as a function of said binary word and the first clock frequency.

8. The oscillator according to claim 7, wherein the number of output bits from the second accumulation stage is multiplied by N in a multiplier or multiplexer before being introduced into the input of the first stage.

9. The oscillator according to claim 7, wherein the first accumulation stage includes at least a first accumulator the output lines of which defining a certain number of parallel output bits or binary signals are connected to inputs of the first accumulator to perform an addition with the first number of most-significant bits of the binary word at every cycle of the first clock frequency, and wherein the second accumulation stage includes at least a second accumulator the output lines of which defining a certain number of parallel output bits or binary signals are connected to inputs of the second accumulator to perform an addition with the second number of least-significant bits of the binary word at each cycle of the second clock frequency.

10. The oscillator according to claim 7, wherein a third input register of the first accumulation stage stores a third number of most-significant bits of a second binary word having an equivalent bit number to the first binary word, said second binary word defining a known carrier frequency phase extracted from a receiver memory, and wherein a fourth input register of the second accumulation stage stores a fourth number of least-significant bits of the second binary word, the total number of most-significant and least-significant bits being equal to or less than the number of bits of the second binary word.

11. The oscillator according to claim 7, wherein the first accumulation stage comprises a first carry save adder receiving at its inputs the first and third most-significant bit numbers of the first and second binary words, a second carry save adder the inputs of which are connected to the outputs of the first carry save adder, a first carry propagate adder the inputs of which are connected to the outputs of the second carry save adder, and a first flip-flop unit the inputs of which are connected to the outputs of the first carry propagate adder, the first unit generating output bits or binary signals of the first stage at each cycle of the first clock frequency, several output lines of the first flip-flop unit being connected to inputs of the second carry save adder, while at least one output line of the first unit supplies the oscillator output signal, and wherein the second accumulation stage includes a third carry save adder receiving at inputs the second and fourth least-significant bit numbers of the first and second binary words, a second carry propagate adder the inputs of which are connected to the outputs of the third carry save adder, and a second flip-flop unit the inputs of which are connected to the outputs of the second carry propagate adder, the second unit generating output bits or binary signals of the second stage at each cycle of the second clock frequency, several output lines of the second unit being connected to inputs of the third carry save adder, while a certain number of output bits or binary signals of the second stage are multiplied by N, which is a multiple of 2, in a multiplier or multiplexer to be introduced at the inputs of the first carry save adder every N cycles of the first clock frequency.

12. The oscillator according to claim 7, wherein the two accumulation stages each include at the input at least a register for receiving, in a bit-parallel architecture, said binary word bits, a first register receiving the first number of most-significant bits and a second register receiving the second number of least-significant bits, the total number of most-significant and least-significant bits being equal to or less than the number of bits of the binary word.

13. The oscillator according to claim 12, wherein the first accumulation stage includes at the input a third register for receiving in a bit-parallel architecture a third number of most-significant bits of a second binary word, with an equivalent number of bits to the first binary word, and wherein the second accumulation stage includes at the input a fourth register for receiving a fourth number of least-significant bits of the second binary word, the total number of most-significant and least-significant bits being equal to or less than the second binary word bit number.

* * * * *